United States Patent
Shroff et al.

(10) Patent No.: US 12,132,703 B2
(45) Date of Patent: Oct. 29, 2024

(54) AUTOMATIC DISCOVERY OF ACCESS POINT (AP) PERSONA AND CONFIGURATION DERIVATION IN MULTI AP MICROBRANCH DEPLOYMENT

(71) Applicant: HEWLETT PACKARD ENTERPRISE DEVELOPMENT LP, Spring, TX (US)

(72) Inventors: Nilay Shroff, Karnataka (IN); Piyush Agarwal, Santa Clara, CA (US); Mohan Ram Bhadravati Ramakrishna Bhat, Karnataka (IN); Shreekanthayya Hiremath, Karnataka (IN); Narayanasami Vijayaraghavan, Karnataka (IN); Mahesh Dantakale, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/190,592

(22) Filed: Mar. 27, 2023

(65) Prior Publication Data

US 2024/0333682 A1    Oct. 3, 2024

(51) Int. Cl.
  *H04L 61/5014* (2022.01)
  *H04L 101/622* (2022.01)
  *H04L 101/668* (2022.01)

(52) U.S. Cl.
  CPC .... *H04L 61/5014* (2022.05); *H04L 2101/622* (2022.05); *H04L 2101/668* (2022.05)

(58) Field of Classification Search
  CPC .......... H04L 61/5014; H04L 2101/668; H04L 2101/622
  See application file for complete search history.

(56) References Cited

U.S. PATENT DOCUMENTS

| | | | |
|---|---|---|---|
| 7,099,944 B1 * | 8/2006 | Anschutz | H04L 61/5014 709/227 |
| 8,966,018 B2 | 2/2015 | Bugwadia et al. | |
| 9,398,629 B2 | 7/2016 | Mohandas et al. | |
| 9,407,495 B2 | 8/2016 | Jönsson et al. | |
| 10,212,210 B2 | 2/2019 | Cho et al. | |
| 2007/0011301 A1 | 1/2007 | Ong et al. | |
| 2009/0080448 A1 * | 3/2009 | Tarra | H04L 65/765 370/401 |
| 2009/0129386 A1 | 5/2009 | Rune | |
| 2009/0292794 A1 * | 11/2009 | Ding | H04L 67/563 709/221 |
| 2013/0059530 A1 * | 3/2013 | Xu | H04L 41/0803 455/39 |

(Continued)

*Primary Examiner* — Viet D Vu
(74) *Attorney, Agent, or Firm* — Sheppard Mullin Richter & Hampton LLP

(57) ABSTRACT

Systems and methods are provided for prevent network outages and improve communication effectiveness by implementing an automatic discovery method that enables the AP to act dynamically to determine its persona as a WAN AP or LAN AP. Based on the determination, the AP can receive the appropriate configuration settings in a configuration file from the central controller (e.g., Aruba central config service) for its dynamic persona. In some examples, the administrator user may define an AP identifier (e.g., MAC addresses) of the network devices in the corresponding microbranch for authentication and authorization.

20 Claims, 9 Drawing Sheets

(56) References Cited

U.S. PATENT DOCUMENTS

2013/0205329 A1\* 8/2013 Markley ............ H04N 21/2541
  725/93
2017/0111851 A1\* 4/2017 Zhang ................... H04W 24/02
2019/0306710 A1\* 10/2019 Cammarota .......... H04W 12/06
2020/0295961 A1 9/2020 Zhuang et al.
2021/0044478 A1 2/2021 Seshadri
2021/0112426 A1\* 4/2021 Laroche ................ H04W 24/02
2021/0226817 A1 7/2021 Oswal et al.
2022/0038422 A1 2/2022 Lu et al.

\* cited by examiner

AUTOMATIC DISCOVERY OF ACCESS POINT (AP) PERSONA AND CONFIGURATION DERIVATION IN MULTI AP MICROBRANCH DEPLOYMENT

BACKGROUND

An Access Point (AP) provides configuration settings and accessibility for network devices to connect to a wired, communication network. The AP may be a wired AP or wireless AP, where each of the network devices can connect to the AP directly instead of using wires to connect to the internet service provider (ISP) to reach the wired, communication network. Thus, APs permit connections to the communication network to be more convenient, secure, and cost-efficient.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
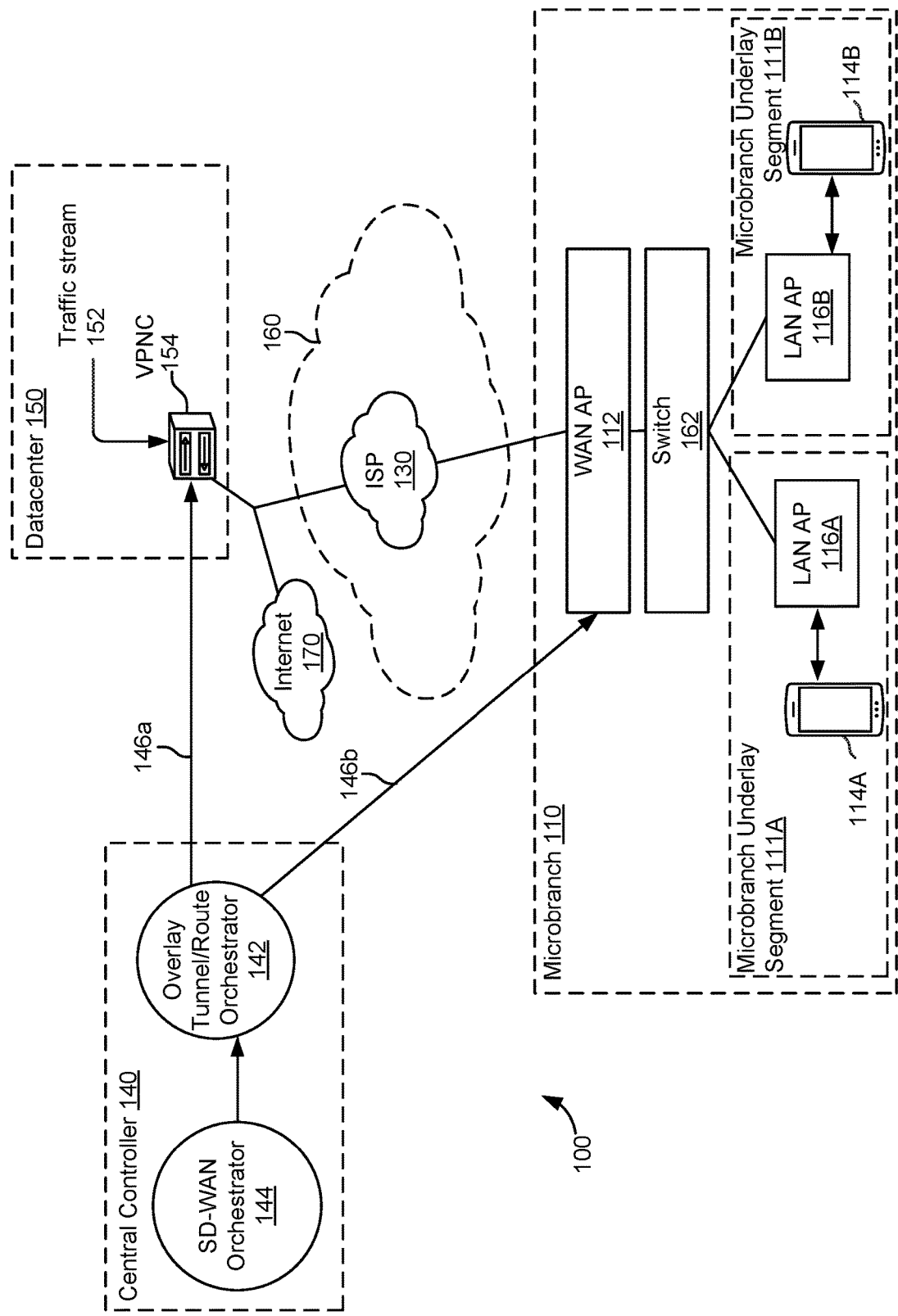
FIG. 1 is a diagram showing an example computing environment having a plurality of microbranches with WAN and LAN connections, in accordance with some embodiments described herein.

The figures are not exhaustive and do not limit the present disclosure to the precise form disclosed.

DETAILED DESCRIPTION

When a single AP connects a plurality of network devices to an ISP and corresponding communication network, the connection architecture between the network devices, AP, and ISP may be considered a single-AP deployment. Some communication network deployments can have a remote branch site, referred to as a microbranch. The microbranch is a small location that can operate away from a robust, IT-managed, secure network as is used at headquarters. The microbranch can often provide a consistent experience for end users that operate the network devices that connect to the AP, referred to as the microbranch AP, whether the user logs in/on from a home office or corporate campus.

The microbranch AP may be configured to support more than one deployment model, including a centralized L2 deployment (e.g., client traffic is GRE/IPSec encapsulated) or a distributed L3 deployment (e.g., client traffic is IPSec encapsulated, which may be similar to traditional site-to-site VPN). For example, when a Generic Routing Encapsulation (GRE) and IPSec encapsulation is implemented, the deployment can create GRE tunnel with a gateway device and encapsulate network traffic using the GRE protocol, and also create an Internet Protocol Security (IPSec) tunnel with a Virtual Private Network Client (VPNC) cluster located in headquarter/datacenter location. The IPSec protocol may be used for encrypting data traffic as it travels through the IPSec tunnel, at least in part because the microbranch location and the headquarter location may be implemented a Wide Area Network (WAN) apart. The microbranch AP can allow AP users, at a remote branch location, to connect to headquarter location over the Internet. Since the Internet is involved, data traffic between the Microbranch and headquarter is "GREoIPSec (GRE over IPsec)" or "IPSec" encapsulated. That is, the traffic between the Microbranch AP and VPNC cluster is encrypted.

In some examples, the microbranch AP may connect to other APs in the microbranch that serve different purposes. For example, a first microbranch AP may help connect the network devices within one segment of a Local Area Network (LAN) in the microbranch and a second microbranch AP may help connect the network devices within another segment of the same LAN in the microbranch. In another example, a microbranch can help connect the first microbranch AP to the ISP using a Wide Area Network (WAN) connection. The first microbranch AP may be considered a LAN AP and the second microbranch AP may be considered the WAN AP. In this example of a multi-AP microbranch deployment, the AP could be configured either as a "WAN AP" or a "LAN AP", where the "WAN AP" connects to WAN facing interface (e.g., an ISP) and the "LAN AP" connects to the "WAN AP" (e.g., the southbound interface of the WAN AP, which implements a local DHCP server).

The determination of being a WAN AP or LAN AP may be based on configuration settings implemented at the AP and received from a central controller (e.g., Aruba Central). For example, the configuration settings listed in a configuration file can identify a formation of an IPsec tunnel, or configuration file can identify the formation of an IPSec tunnel to a VPNC cluster or change the IPsec tunnel to a different VPNC cluster of the headquarter location. The network architecture can use a WLAN tunnel orchestration service implemented at the central controller to set up the communication tunnels between the AP and a VPNC cluster of the headquarter location (e.g., IPsec tunnel and GRE tunnel). The microbranch AP can establish the communication tunnels with the VPNC and encapsulate the network traffic in the GRE protocol over the IPSec tunnel.

Since WAN APs and LAN APs require individual configuration settings, administrators traditionally need a thorough understanding of functioning of both WAN APs and LAN APs in multi-AP microbranch deployment. Furthermore, administrative users may spend a significant amount of time and understand subtle configuration differences between WAN APs and LAN APs. It is possible in traditional systems that the administrative users could misconfigure APs, leading to a network outage or other connection issues in the microbranch. In networks with thousands of microbranches, misconfiguration could lead to network outages in multiple branches.

As described herein, the system may help prevent network outages and improve communication effectiveness by implementing an automatic discovery method that enables the AP to act dynamically to determine its persona as a WAN AP or LAN AP. Based on the determination, the AP can receive the appropriate configuration settings in a configuration file from the central controller (e.g., Aruba central config service) for its dynamic persona. In some examples, the administrator user may define an AP identifier (e.g., MAC addresses) of the network devices in the corresponding microbranch for authentication and authorization.

The automatic discovery process may use DHCP Option 43 when the AP derives its Internet Protocol (IP) address using the Dynamic Host Configuration Protocol (DHCP). For the WAN AP (e.g., the AP connected to the WAN Port), the ISP's Customer Premise Equipment (CPE) may be the DHCP server. For the LAN AP, the WAN AP may be the DHCP server (e.g., local to the AP), which allocates IP addresses to LAN APs in the branch. The local DHCP server running on the WAN AP may have the DHCP Option 43 configured/active. The DHCP Option 43 may contain information regarding WAN AP IP address, serial number, and media access control (MAC) address. The ISP DHCP server, which offers IP addresses to the WAN AP, may not include the vendor-specific DHCP Option 43. So, when the DHCP Option 43 is configured or active, the AP determines it is a LAN AP in the microbranch, and requests the LAN AP configuration settings in a configuration file from the central controller. Otherwise, when the DHCP Option 43 is not configured or active, the AP determines that it is a WAN AP in the microbranch, and requests the WAN AP configuration settings from the central controller.

The discovery process of defining a persona by the AP may be automatically initiated when the AP boots up. For example, when a microbranch AP (e.g., in factory default state or non-factory default state) boots up, it starts a DHCP transaction through uplink port. For WAN AP, the uplink port is connected to WAN interface (i.e. typically ISP CPE device) and for LAN AP, the uplink port is connected to a switch or in some cases, it might be directly connected to the downlink port of WAN AP. So, the AP whose uplink port is connected to the ISP CPE receives its DHCP IP address from ISP DHCP server (which does not contain the vendor-specific DHCP option 43). By not receiving this vendor-specific DHCP option 43 in the DHCP offer, this AP would discover itself as WAN AP and connect to the central controller with its persona set to WAN AP. Similarly, the AP whose uplink port is connected to a port on switch will receive the IP address from the DHCP server running on the WAN AP (e.g., under the assumption in this example that that the WAN AP is functional and has the correct configuration from the central controller). The DHCP offer from the WAN AP can contain vendor-specific DHCP option 43. By receiving this DHCP option 43 in the DHCP offer from WAN AP, this AP can discover itself as LAN AP and connects to the central controller with persona set to LAN AP.

Once an AP assumes the role of a WAN AP in a multi-AP microbranch, the AP can start advertising periodic unsolicited Microbranch Discovery Protocol (MDP) messages (e.g., at a regular interval for some pre-determined amount of time). The MDP message contains the same information as is present in vendor-specific DHCP Option 43 (i.e., WAN AP IP address, serial number, and MAC address). This helps with automatically detecting changes in the network. In one example, when a WAN AP is replaced with a new AP, the new AP may discover itself as the WAN AP in the microbranch. The new WAN AP may now start running the local DHCP server, advertising the unsolicited Management Data Plane (MDP) message, and the LAN APs in the branch could learn about the presence of the new WAN AP.

FIG. 1 is a diagram showing an example computing environment having WAN and LAN communication channels in accordance with embodiments described herein. In illustration 100, a communication network is shown with various components, including microbranch 110, microbranch underlay segment 111A, microbranch underlay segment 111B, central controller 140, datacenter 150, WAN 160, and Internet 170. Microbranch 110 is provided with a plurality of microbranch underlay segments 111 (illustrated as first microbranch underlay segment 111A and second microbranch underlay segment 111B). Microbranch 110 comprises WAN AP 112 (acting as a gateway, router, and support of SD-WAN functions) and switch 162 that may be located downstream from WAN AP 112.

As used herein, microbranch 110 may refer to a physical location at which one or more network devices 114 may connect to WAN 160. For example, microbranch 110 may be a remote office of an organization, a café/coffee shop, a home office, etc. While only a single branch (e.g., microbranch 110 comprising WAN AP 112 and a plurality of microbranch underlay segments 111 each with its own LAN AP 116) is depicted in the example of FIG. 1, large scale SD branch deployments may include any number of microbranches 110 and microbranch underlay segments 111 within them. Each microbranch 110 may have its own local area network (LAN). In certain examples, microbranches 110 may comprise various locations associated with a particular organization and microbranch underlay segments 111 may comprise a single office or apartment associated with a single LAN. In other examples, microbranch 110 may not all be associated with a single organization. Various network devices 114 (e.g. hosts, user-associated devices, end-point devices, smartphones, or other network devices such as branch gateways or routers, etc.) of a given branch may communicate with each other over the branch's LAN. A branch may have any number of end-points. In this example, WAN AP 112 may receive traffic (such as multicast traffic) associated with traffic stream 152.

Each of the plurality of microbranch underlay segments 111 may correspond with a LAN. The devices within the plurality of microbranch underlay segments 111 comprise a LAN AP 116 (illustrated as first LAN AP 116A in first microbranch underlay segment 111A and second LAN AP 116B in second microbranch underlay segment 111B) and network devices 114 (illustrated as first network device 114A in first microbranch underlay segment 111A and second network device 114B in second microbranch underlay segment 111B). A given client device or host (illustrated as first network device 114A and second network device 114B), may be connected to LAN AP 116 that communicates with WAN AP 112.

LAN AP 116 is configured to generate a communication channel between network device 114 and network 170 using various devices in microbranch 110, though it may not be the only point of communication. Multiple APs are illustrated, though microbranch 110 may include one or more LAN APs 116 with multiple controllers and/or multiple communication points. In some embodiments, LAN AP 116 communicates with the network 170 through switch 162 and WAN AP 112. In some examples, LAN AP 116 may comprise multi-band radios, such as dual-band simultaneous radios that can operate with, e.g., eight radio chains in the 5 GHz band and four radio chains in the 2.4 GHz band. At runtime, the 5 GHz radio can be converted into two logical radios each operating with four radio chains, for example. Channel switching can be prompted by, e.g., detection of radar or when channel utilization is beyond acceptable limits or in response to some regulatory change(s) affecting channel usage or allocation. Other features of a generic access point may be implemented with LAN AP 116 as well.

WAN AP 112 may refer to a network device (hardware or software) which transfers traffic between devices (e.g., LAN AP 116 and switch 162) associated with microbranch 110 and other networks. For example, WAN AP 112 may transfer traffic between WAN 160 and the various network devices (not shown) of their branch (e.g. other branch gateways, hosts, etc.). In some examples, multiple gateways (each associated with WAN AP 112 acting as a gateway device) may be deployed at microbranch 110 for load balancing and redundancy purposes.

WAN AP 112 is configured to generate a VPN tunnel with VPN Concentrator (VPNC) 154 located in data center 150. WAN AP 112 also implements a radius-proxy function for clients connected to LAN AP 116 in microbranch 110. WAN AP 112 also runs a DHCP server for serving IP addresses to LAN AP 116 and clients in the branch. LAN AP 116 bridges data traffic towards WAN AP 112 and can act as an authenticator for clients directly associated to it (e.g., network devices 114).

In some examples, there may be configuration differences between WAN AP 112 and LAN AP 116, even though they can be part of the same microbranch 110. For instance, the SSID name could be same for both WAN AP and LAN AP, but the forwarding-mode configured under this SSID may be different. As an example, SSID forwarding-mode is set to "bridge" on LAN AP and, on WAN AP, the same SSID forwarding-mode is set to "tunnel". In some deployments WAN AP may not broadcast the SSID and only LAN APs may broadcast the SSID.

In some examples, the uplink port or VLAN configuration may also be different between the WAN AP and LAN AP. For instance, the uplink port may correspond with a trunk on the LAN AP and may correspond with an access port on the WAN AP.

In some examples, certain configuration settings are only applicable on WAN AP, including VPN, SD-WAN, DHCP server, and route/PBR configuration. In some examples, certain configuration settings are the same across both WAN AP and LAN APs, including the firewall policies configured under a user role, DPI, airgroup, ntp-server, country-code, and other configuration settings.

Internet Service Provider (ISP) 130 may provide access to Internet 170 or other communication network for network devices 114 via one or more devices illustrated in FIG. 1, including through the plurality of LAN APs 116. ISP 130 may be included in WAN 160 controlled via an SD-WAN, and a second end-point device, which in this case may be VPNC 154 (which receives traffic from a traffic stream source 152) of a datacenter 150.

Traffic stream 152 may be any data transmission (e.g. streaming media, information dissemination, etc.) addressed to network devices 114. In this example, only one traffic stream (i.e., traffic stream 152) is depicted in datacenter source 150. However, in other examples, datacenter 150 may include any number of traffic streams and microbranch 110 may include any number of traffic sources, recipients, etc.

In general, a VPNC, such as VPNC 154 may refer to a hardware or software application used for connecting VPNs. As depicted, datacenter 150 includes VPNC 154. Accordingly, VPNC 154 may be used to transmit data associated with traffic stream 152 to WAN AP 112 of microbranch 110 (as orchestrated by Overlay Tunnel/Route Orchestrator 142).

Central controller 140 may be a cloud-based SD-WAN technology platform which includes a centralized service capable of performing orchestration operations within a given WAN (e.g. WAN 160). Generally, SD-WAN orchestration may refer to a centralized administration service(s) that provides cloud-delivered WAN control and management. In certain examples, central controller 140 may include additional centralized network management services. Accordingly, residing within central controller 140 may be various sub-services. As depicted, central controller 140 includes Overlay Tunnel/Route Orchestrator 142 which may correspond with sub-services of SD-WAN Orchestrator 144, which may orchestrate tunnels, routes, orchestrate key exchange, creating and managing clusters, and so on. The services may be implemented separately or in combination at Overlay Tunnel/Route Orchestrator 142.

Overlay Tunnel/Route Orchestrator 142 may be a central management entity which orchestrates routes for traffic between datacenter 150 and microbranch 110 via connection 146 (illustrated as first connection 146a between Overlay Tunnel/Route Orchestrator 142 and VPNC 154, second connection 146b between Overlay Tunnel/Route Orchestrator 142 and WAN AP 112). For example, Overlay Tunnel/Route Orchestrator 142 may include a tunnel manager process locally to form an overlay tunnel, then generate and transmit messages to each of the end points through the overlay tunnel (VPNC 154, WAN AP 112, and first LAN AP 116A). Each of the end points may include a similar tunnel agent process to receive and parse the messages via the overlay tunnel from the Overlay Tunnel/Route Orchestrator 142. In order to accomplish this task, Overlay Tunnel/Route Orchestrator 142 may identify or manage aspects of network topology/configuration, as well as the needs of the network's end-points. Abreast of this information, Overlay Tunnel/Route Orchestrator 142 may then orchestrate routes between an appropriate VPNC and WAN AP (acting as a gateway device) and on to intended recipients.

In some examples, neither LAN AP illustrated in FIG. 1 may create an overlay tunnel with VPNC 154 and only WAN AP may create an overlay tunnel with VPNC 154. In this instance, no connection path may exist between Overlay Tunnel/Route Orchestrator 142 and LAN APs 116, and a connection path may exist between Overlay Tunnel/Route Orchestrator 142 and WAN AP 112.

As a central management entity incorporated within central controller 140, Overlay Tunnel/Route Orchestrator 142 may collect this information and make these determinations in a manner which reduces WAN bandwidth consumption. Said differently, centralized decision-making within Overlay Tunnel/Route Orchestrator 142 greatly reduces the number of communications/decisions required to transmit traffic, such as multicast traffic, within, e.g., a large scale SD branch deployment. As described above, under the decentralized approach used by existing technologies, much of the aforementioned information would be communicated among the various network devices/nodes (e.g. routers, branch gateways, VPNCs) of a network tasked with transmitting traffic. Overlay Tunnel/Route Orchestrator 142 may obtain certain network configuration/topology information from another service(s) of SD-WAN orchestrator 144, and information related to the needs of the network's recipients/hosts from designated branch gateway leaders.

In some examples, a route computation engine in Overlay Tunnel/Route Orchestrator 142 may calculate routes for traffic based on the aforementioned source information (e.g., which VPNC is associated with a given multicast stream) and receiver information (which branch gateways are designated leaders for the given multicast stream). In this example, Overlay Tunnel/Route Orchestrator 142 may implement a route orchestration process primarily acting as an overlay route orchestrator. In some examples, the route computation engine may learn to calculate optimal routes for reducing bandwidth consumption for WAN 160. For example, Overlay Tunnel/Route Orchestrator 142 may employ artificial intelligence (AI) or machine learning to determine overlay tunnels for multicast traffic between VPNCs and branch gateways (e.g., based on traffic requirements and historical data).

In other examples, Overlay Tunnel/Route Orchestrator 142 may take advantage of routes which have already been calculated by central controller 140 (and/or its subservices). Existing SD-WAN services typically calculate routes for unicast traffic between VPNCs and branch gateways. Accordingly, Overlay Tunnel/Route Orchestrator 142 may orchestrate traffic through these pre-calculated routes.

It should be understood that in a given network, the "underlay" or "underlay network" may refer to the physical connections of the network (e.g., Ethernet). By contrast, the "overlay" or "overlay network" may refer to a logical network which uses virtualization to build connectivity on top of the physical infrastructure of the network using tunneling encapsulation. In other words, "overlay tunnels" may refer to virtual links which connect nodes of a network. Here, overlay tunnels may connect VPNCs and the microbranch WAN AP. Various protocols such as IPSec and GRE may be used to transmit network traffic through these overlay tunnels, as discussed herein. In general, SD-WAN architectures like the one depicted may rely on overlay tunnels to connect the various branches and other nodes of their network.

Figure 2:
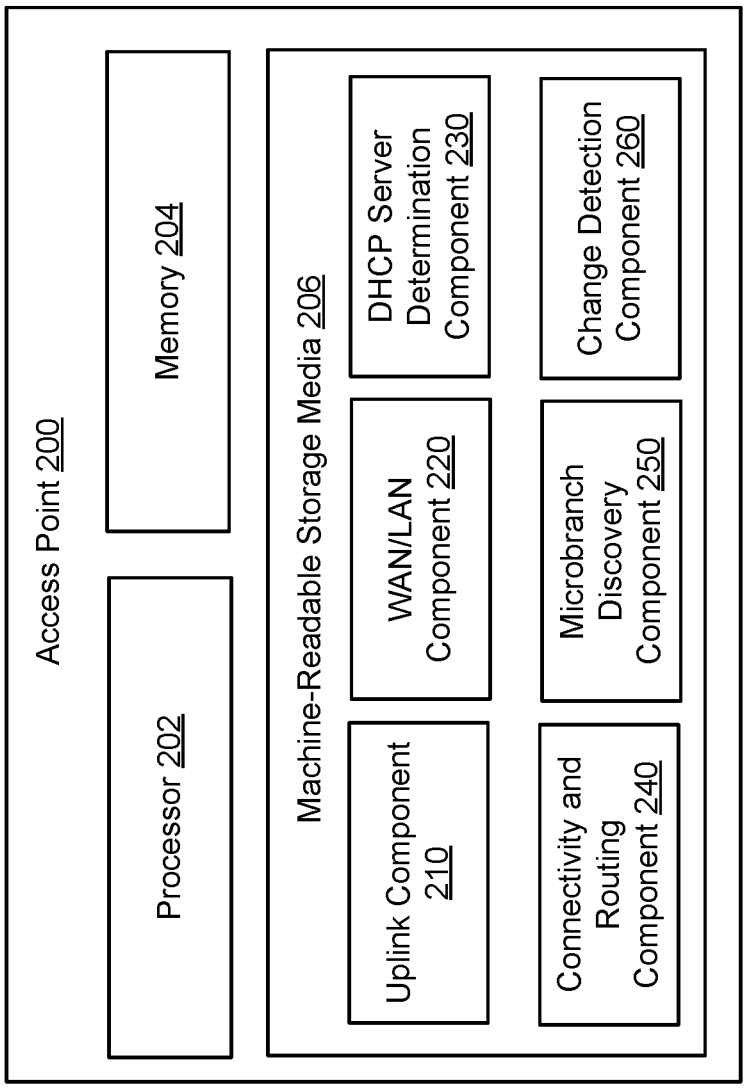
FIG. 2 is an illustrative example of an access point, in accordance with some embodiments described herein.

FIG. 2 is an illustrative example of an access point, in accordance with some embodiments described herein. WAN AP 112 and LAN AP 116 in FIG. 1 are some examples of access point 200 illustrated in FIG. 2, which may be configured to establish communication connections to various networks and detect/correct communication issues.

Access point 200 comprises processor 202, memory 204, and machine-readable storage media 206 that may implement machine-readable instructions to perform various actions within the network, including the communication network illustrated in FIG. 1. For example, machine-readable storage media 206 may comprise uplink component 210, WAN/LAN component 220, DHCP server determination component 230, connectivity and routing component 240, microbranch discovery component 250, and change detection component 260.

Uplink component 210 is configured to manage physical or virtual uplinks between the AP (acting as a gateway device) and another network device. For example, the physical uplink may comprise a wired connection between WAN AP 112 to ISP 130. The connection via physical uplinks may be initiated by a Dynamic Host Configuration Protocol (DHCP) handshake (e.g., via Ethernet port 001 of WAN AP 112) followed by a broadcast process answered by ISP 130 or similar connection process (e.g., zero-touch provisioning). In this example, the ISP connection would be associated to WAN AP 112.

In a virtual uplink implementation, uplink component 210 is configured to manage the virtual connection between the AP and another device using a virtual connection. For example, the virtual uplink may comprise a virtual (e.g., wireless) connection between WAN AP 112 to switch 162 to ISP 130. In some examples relating to the multi-AP microbranch deployment, WAN AP 112 may directly connect to ISP 130. Switch 162 may be connected to the south (downlink port) of WAN AP 112. The connection via virtual uplinks may be managed by an orchestrator or central processor (e.g., at central controller 140 of FIG. 1).

In some examples, uplink component 210 may access the network through a WAN connection and virtual uplink engine 220 may access the network by forming a generic routing encapsulation (GRE) tunnel from the downstream LAN. In other words, from the point of view of WAN AP 112, ISP 130 is a physical uplink connection (via WAN) or a virtual uplink connection (via LAN), both of which provide access to WAN 160.

WAN/LAN component 220 is configured to initiate an automatic discovery method to dynamically determine its persona (e.g., WAN AP or LAN AP). Based on the persona, central controller can derive the configuration file and provide the configuration file to the AP. The configuration file for the WAN AP or LAN AP may be different with different configuration settings. The system administrator may generate the configuration file for a microbranch configuration setting once and then the configuration settings can be derived and repeated to respective LAN AP and WAN AP configuration settings. In some examples, the LAN AP may not be restricted to LAN AP configuration as a subset of WAN AP configuration.

DHCP server determination component 230 is configured to derive the IP address using DHCP. For the WAN AP (i.e., the AP connected to the WAN Port), the ISP's customer premise equipment (CPE) may be identified as the DHCP server. For the LAN APs, the WAN AP may be identified as the DHCP server.

DHCP server determination component 230 is also configured to run a local DHCP server when the AP is operating as a WAN AP. The local DHCP may be run on the management (MGMT) VLAN (e.g., MGMT VLAN) which is used for allocating IP address to LAN APs in the branch (e.g., MGMT VLAN IP). For example, upon receiving the configuration file from the central controller, WAN AP may run a local DHCP server on management VLAN (for serving IP address to LAN APs in the branch) and optionally, depending on the configuration, another DHCP server for serving IP address to other network devices in branch.

The DHCP server determination may affect the IP address stored at the APs in the branch. For example, when the WAN IP first boots up and connects to the ISP DHCP server, the first IP address may correspond with an uplink IP. Then, WAN AP may connect to the central controller, download the configuration files, and start running the DHCP server for serving the IP address to LAN AP in the branch. In this case, the WAN AP would install at least two IP addresses. The first IP installed on the WAN interface is referred to as the "Uplink IP" and the second IP which is installed on its downlink interface is the "MGMT VLAN IP" address.

In some examples, the MGMT VLAN IP address corresponds with one of the IPs from the DHCP server pool configured on WAN AP for serving the LAN APs in the microbranch. The LAN AP, which receives the DHCP IP address from the WAN AP, is also associated with a MGMT VLAN IP address because it is also allocated from the DHCP address pool configured on WAN AP.

In some examples, the DHCP server is configured to use DHCP Option 43 to exchange vendor-specific configuration information. DHCP Option 43 may correspond with a binary buffer to store the information and may be optional. For example, the information can include ACS parameters (e.g., ACS URL, username, and password), service provider identifier (e.g., which is acquired by the CPE from the DHCP server and sent to the ACS for selecting vendor-specific configurations and parameters), and PXE server address (e.g., which is used to obtain the boot file or other control information from the PXE server). The network configuration parameters may be carried in different sub-options of DHCP Option 43, including an option type, option length, and option value.

The local DHCP server running on WAN AP 112 may include a vendor-specific DHCP option 43 configured with a value. The DHCP option 43 may contain information regarding WAN AP IP address, serial number, and MAC address. The ISP DHCP server which offers IP address to WAN AP may not include the vendor specific DHCP option 43.

Connectivity and routing component 240 is configured to update a route path for sending or receiving data. This may include identifying a route to transmit data or changing a default uplink to either a virtual uplink or physical uplink (e.g., via uplink component 210).

Microbranch discovery component 250 is configured to initiate a discovery process of the AP to identify its persona (e.g., WAN AP or LAN AP). For example, the AP connected to the ISP CPE receives its DHCP IP address from the ISP, which may not contain the vendor-specific DHCP option 43. By not receiving the vendor-specific DHCP option 43 in the DHCP offer, the AP may discover itself as a WAN AP (illustrated as WAN AP 112 in FIG. 1) and then connect to the central controller (illustrated as central controller 140 in FIG. 1) with the persona set to "WAN AP."

Other APs may discover themselves as a "LAN AP." For example, the AP connected on a port on the switch may receive the IP address from the DHCP server running on the WAN AP. The DHCP offer from the DHCP server/WAN AP may contain the vendor-specific DHCP option 43. By receiving the DHCP option 43 in the DHCP offer from the DHCP server/WAN AP, the AP may discover itself as a LAN AP (illustrated as LAN AP 116 in FIG. 1) and then connect to the central controller (illustrated as central controller 140 in FIG. 1) with the persona set to "LAN AP."

The discovery process may also identify the DHCP server, which is described with DHCP server determination component 230.

Microbranch discovery component 250 is also configured to transmit messages to other network devices in microbranch 110. For example, once the AP assumes role of WAN AP in multi-AP microbranch (e.g., as WAN AP 112 in FIG. 1), the AP starts advertising periodic unsolicited MDP messages at regular interval for some time. The MDP message contains the same information as in the vendor-specific DHCP option 43 (i.e., WAN AP IP address, serial number, and MAC address). An illustrative example of an MDP message is provided in FIG. 6.

The timing component of transmitting the MDP messages may vary as an implementation detail. For example, the WAN AP may advertise and transmit MDP messages for 5 minutes. Other devices in the branch may reboot after the WAN AP is active and learn about the presence of WAN AP using DHCP option 43. In another example, the MDP messages may be transmitted after a first WAN AP is replaced with a second AP. In this case, all LAN APs in the branch may learn about the new WAN AP through the MDP messages.

WAN AP discovery may be implemented. For example, the WAN-facing port of WAN AP may be directly connected to the ISP, rather than connected via a switch between WAN AP and ISP. The switch may only be connected to the south (downlink port) of WAN AP.

In some examples, the MDP messages and the DHCP messages are unrelated, such that the discovery process described herein may run independently of discovering the DHCP server.

LAN AP discovery may be implemented. For example, the AP connected to the downlink port of WAN AP may receive the IP address after the WAN AP starts the DHCP server. The messages received from the DHCP server of the WAN AP (e.g., a DHCP offer) may contain the vendor-specific DHCP option 43. By receiving this DHCP option 43 in the messages from the WAP AP, this AP may discover itself as LAN AP and connect to the central controller with a persona set to LAN AP. The cloud-based configuration manager running on the central controller may push the LAN AP specific configuration to this AP.

Change detection component 260 is configured to automatically detect a change in the network by the AP, irrespective of whether the AP is a WAN AP or LAN AP. In multi-AP Microbranch, customer may replace WAN AP with another AP (either due to a hardware fault with WAN AP or the WAN AP is replaced with another high-end AP) or a WAN AP is swapped with a LAN AP. The information may be identified in the MDP message from the WAP AP, which the other APs are configured use to automatically detect such a change in the network. In such cases, the microbranch network may automatically converge and start functioning without any manual intervention from the user.

In some examples, the WAN AP may be replaced with a new AP. The new AP may discover itself as WAN AP in the branch, as described herein. The new AP may start running a local DHCP server (via DHCP server determination component 230) and start advertising unsolicited MDP messages (via microbranch discovery component 250). With the help of the MDP message, LAN APs in the branch could learn about the presence of new WAN AP. When new WAN AP starts advertising MDP messages, the message may comprise the WAN AP IP address, serial number, and MAC address. The LAN AP that receives the MDP message can compare the serial number and MAC address received in MDP message with that of the old WAN AP serial and MAC address (e.g., which is stored in its memory). When the comparison of the serial number and MAC address fails, the LAN AP may discover that the WAN AP in the branch has been replaced. The LAN AP may remove its DHCP address/lease and redo the DHCP handshake and communication process. In some examples, the LAN AP may also force de-authentication of all network devices (e.g., clients) connected to it since, in some examples, the DHCP lease assigned to LAN AP and clients is no longer valid once the WAN AP is replaced.

In some examples, a WAN AP and LAN AP are swapped. Here, the APs may automatically discover their new persona, as described herein and connect to the central controller with new persona. The information may be identified in the MDP message from the WAP AP, which the other APs are configured use to automatically detect such a change in the network. The central configuration manager service can push the appropriate configuration file to these APs.

Figure 3:
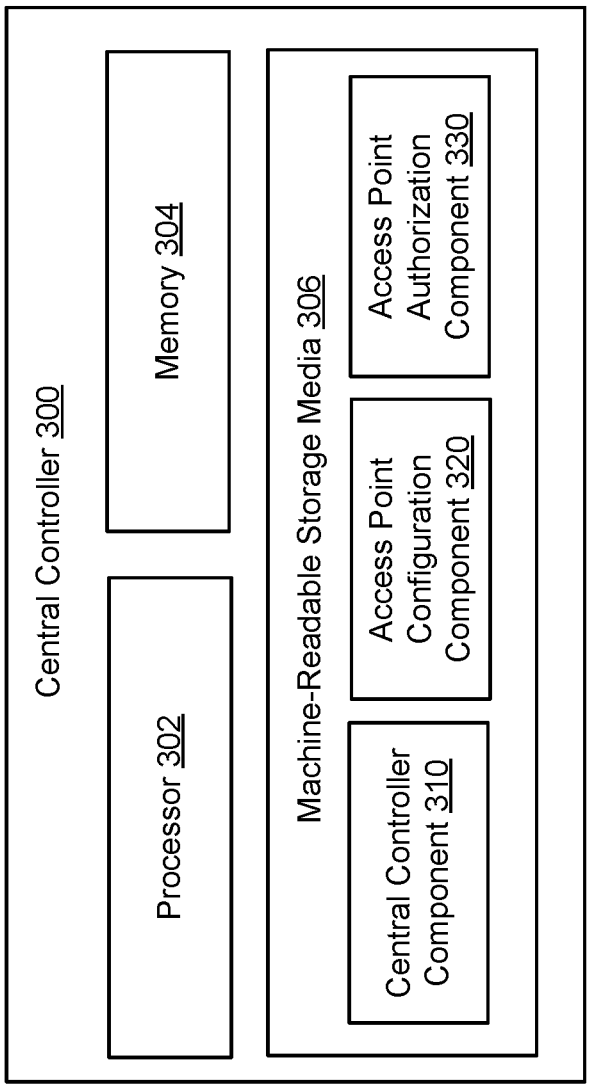
FIG. 3 is an illustrative process of a central controller, in accordance with some embodiments described herein.

FIG. 3 is an illustrative process of a central controller, in accordance with some embodiments described herein. The central management entity incorporated within central controller 140 in FIG. 1 is an example of central controller 300 illustrated in FIG. 3, which may be configured to identify, authenticate, and provide configuration files to network devices in the communication network.

Central controller 300 comprises processor 302, memory 304, and machine-readable storage media 306 that may implement machine-readable instructions to perform various actions within the network, including the communication network illustrated in FIG. 1. For example, machine-readable storage media 306 may comprise central controller component 310, access point configuration component 320, and access point authorization component 330.

Central controller component 310 is configured to implement various network management functions for the network devices communicating with the branches or microbranches. Functions may include, for example, unified management of wireless, wired, VPN, and SD-WAN, AI-based insights of other network devices (e.g., for faster troubleshooting and continuous network optimization), proactive monitoring of the end-user experience, intent-based policy engine and access controls, monitoring and troubleshooting. Central controller component 310 is also configured to facilitate onboarding, configuring, and provisioning of network devices by providing a setup wizard for users, provide flexible configuration options, and zero touch provisioning.

In some examples, central controller component 310 is configured to implement the overlay tunnel orchestrator (OTO) and overlay route orchestrator (ORO) components described herein. For example, central controller 300 may automatically setting up IPsec tunnels between the branch gateway and VPNC (illustrated in FIG. 1). For tunnel orchestration, central controller automates tunnel configuration between the branch and hub sites. The service can be enabled globally or for individual groups. For route orchestration, central controller 300 automates the route advertisement and redistribution process by routing information learnt from each connected branch in a dynamic way. The overlay tunnel and routes may also be monitored. For example, central controller 300 may provide a dashboard or other interface that displays detailed information about the orchestrated tunnels and routes.

Access point configuration component 320 is configured to receive identification of a plurality of access points in a microbranch communication network. The identification of a plurality of access points may identify which APs are authorized to operate in the branch (e.g., microbranch 110 in FIG. 1). The identification of the plurality of access points may be provided by an administrative user and stored with the central controller in memory as a list of pre-authorized devices that are authorized to operate in the branch or microbranch of the communication network. Central controller, via access point configuration component 320, may access memory to determine the access points permitted to operate in the network.

Access point configuration component 320 is also configured to receive a request for a configuration file from an access point in the microbranch communication network. The request may comprise an identifier of the access point and an indication that the access point is a WAN AP for the microbranch communication network or a LAN AP for the microbranch communication network that is determined through a discovery process of the DHCP server in the microbranch communication network.

Access point authorization component 330 is configured to confirm that the identifier of the access point exists in a set of pre-authorized devices that are authorized to operate in the microbranch communication network.

Access point authorization component 330 is also configured to provide the configuration file to the access point in accordance with the access point being the WAN AP or the LAN AP. The configuration file may help the central controller instruct the access point to operate in accordance with parameters defined in the configuration file.

Figure 4:
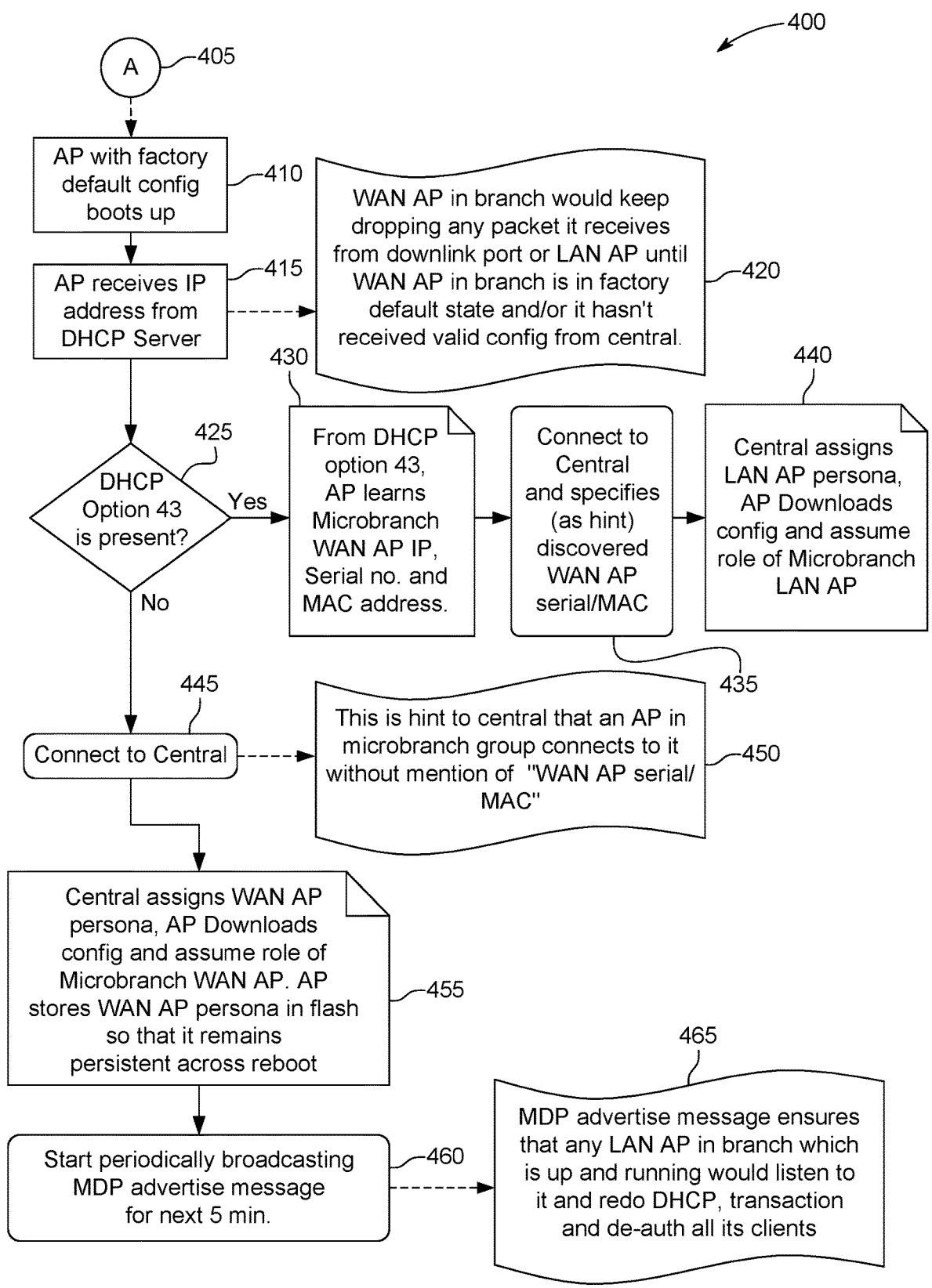
FIG. 4 is an illustrative process, in accordance with some embodiments described herein.

FIG. 4 is an illustrative process, in accordance with some embodiments described herein. In example 400, an access point may perform these operations to help determine its persona in the branch in coordination with the central controller. The access point performing these operations may correspond to WAN AP 112 or LAN AP 116 in FIG. 1 or AP 200 in FIG. 2.

At block 405, the process may start.

At block 410, the AP with factory default configuration settings may boot up or otherwise execute an activation script to become accessible within the network.

At block 415, the AP may receive the IP address from the DHCP server.

At block 420, until the WAN AP in the branch is in a factory default state, the WAN AP in the branch may keep dropping data packets it receives from the downlink port of the switch or the LAN AP. The WAN AP may continue to drop packets until it receives a valid configuration file from the central controller.

At block 425, the AP may determine if the DHCP option 43 is present. If yes, the process may proceed to block 430. If no, the process may proceed to block 445.

At block 430, the AP may learn information about the microbranch WAN AP, including the WAN AP IP number, serial number, and MAC address.

At block 435, the AP may connect to the central controller and specify the discovered WAN AP serial number and MAC address.

At block 440, the central controller may assign the LAN AP persona and transmit the configuration file to the LAN AP. The LAN AP may assume the persona of a microbranch LAN AP.

At block 445, the AP may connect to the central controller (e.g., when the DHCP option 43 is not present).

At block 450, the central controller identifies that the AP in the micro branch connects to it without mentioning the WAN AP serial number and the MAC address.

At block 455, the central controller may assign the WAN AP persona to the AP. The AP may download the configuration file from the central controller and assume the persona of the microbranch WAN AP. The AP may store the WAN AP persona in memory so that it can remain persistent across reboot.

At block 460, the AP may start periodically broadcasting MDP messages. The broadcasting may follow a predetermined time period (e.g., for 5 minutes) determined by an administrative user.

At block 465, the MDP message may ensure that any LAN AP in the branch which is active and running may listen to it. The LAN APs may also redo its stored DHCP transaction values to de-authenticate its clients.

Figure 5:
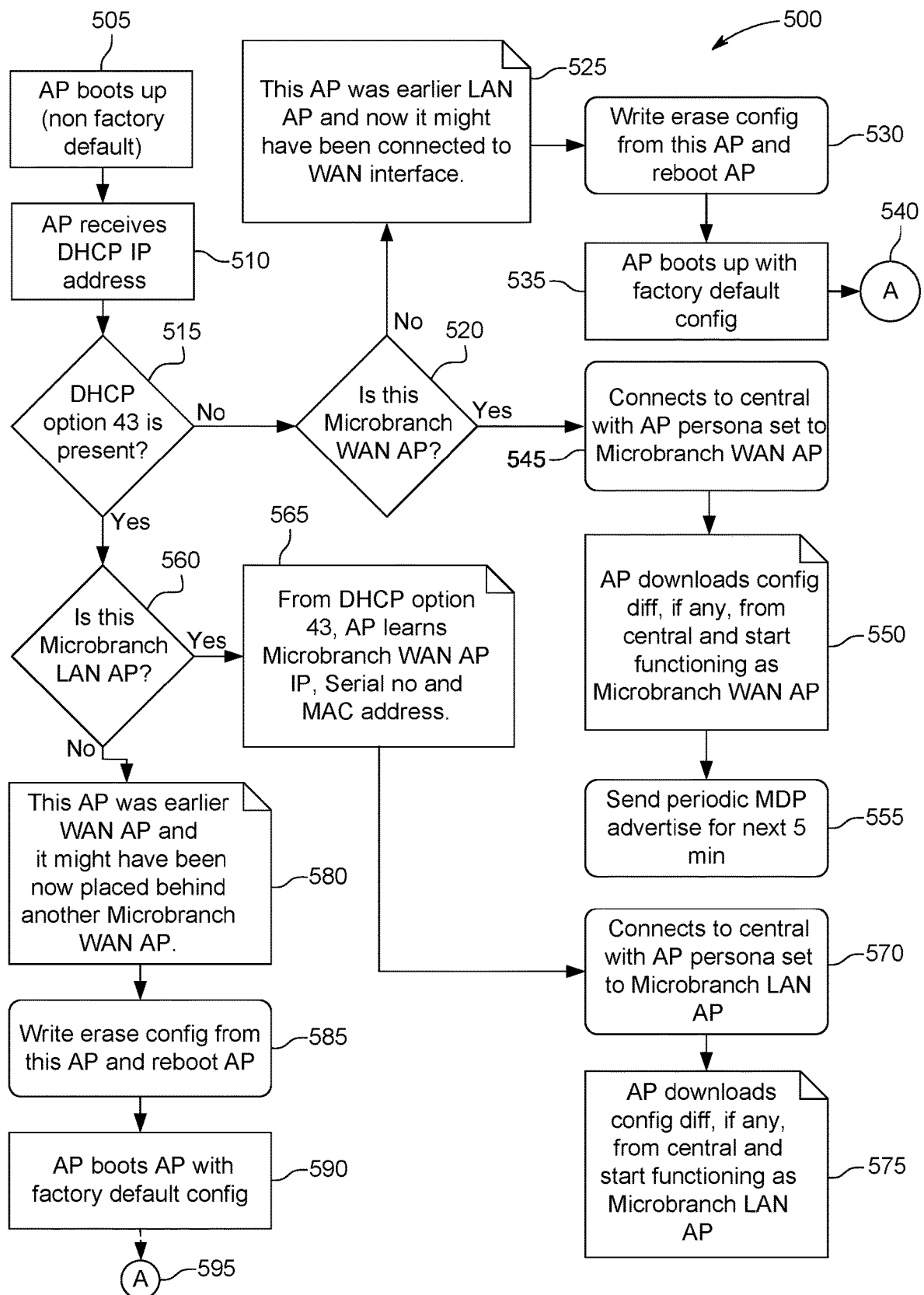
FIG. 5 is an illustrative process, in accordance with some embodiments described herein.

FIG. 5 is an illustrative process, in accordance with some embodiments described herein. In example 500, an access point may perform these operations to help determine its persona in the branch in coordination with the central controller. The access point performing these operations may correspond to WAN AP 112 or LAN AP 116 in FIG. 1 or AP 200 in FIG. 2.

At block 505, the AP boots up as a non-factory default.

At block 510, the AP receives the DHCP IP address.

At block 515, the AP determines if DHCP option 43 is present. If yes, the process proceeds to block 560. If no, the process proceeds to block 520.

At block 520, the AP may determine if this is a microbranch WAN AP. If yes, the process proceeds to block 545. If no, the process proceeds to block 525.

At block 525, the AP was earlier identified as a LAN AP and now might be connected to a WAN interface with the switch.

At block 530, the AP may erase or otherwise remove the configuration from the AP and trigger a reboot process of the AP.

At block 535, the AP starts with the factory default configuration.

At block 540, the process may proceed to the process illustrated with FIG. 4, including blocks 405-465.

At block 545, the AP connects to the central controller with the AP persona set to microbranch WAN AP.

At block 550, the AP downloads the configuration file from the central controller. The configuration file may comprise any differences between the previous configuration file and the current configuration file. The AP may start functioning as the microbranch WAN AP.

At block 555, the AP may send periodic MDP messages to advertise its persona to other devices in the network.

At block 560, the AP may determine whether it is a microbranch LAN AP or not. If yes, the process may proceed to block 565. If no, the process may proceed to block 580.

At block 565, the AP learns the microbranch WAN AP IP address, serial number, and MAC address. The information may be learned from the DHCP option 43.

At block 570, the AP connects to the central controller with the AP persona set to microbranch LAN AP.

At block 575, the AP downloads the configuration file from the central controller. The configuration file may comprise any differences between the previous configuration file and the current configuration file. The AP may start functioning as the microbranch LAN AP.

At block 580, the AP was earlier set to the WAN AP and it may have been replaced by another micro branch when AP.

At block 585, the AP may erase or otherwise remove the configuration from the AP and trigger a reboot process of the AP.

At block 590, the AP starts with the factory default configuration.

At block 595, the process may proceed to the process illustrated with FIG. 4, including blocks 405-465.

Figure 6:
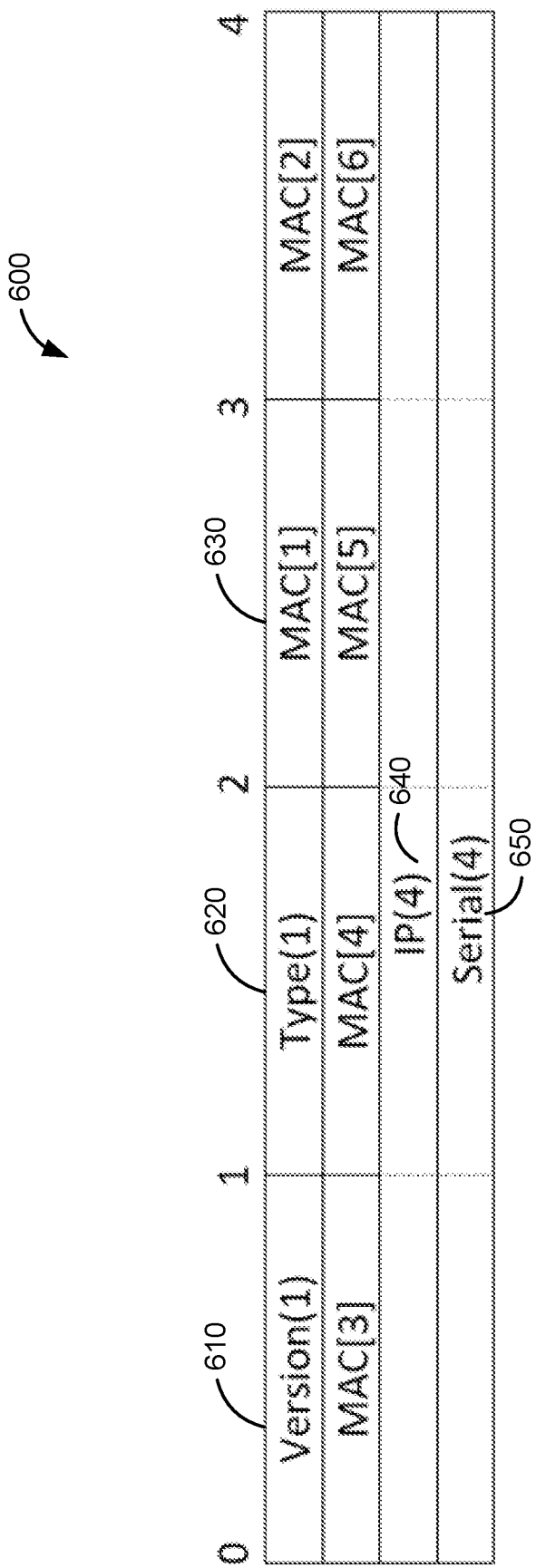
FIG. 6 is an example of an MDP message header format, in accordance with some embodiments described herein.

FIG. 6 is an example of an MDP message header format, in accordance with some embodiments described herein. In example 600, the MDP message header format may correspond with a proprietary L2-broadcast discovery message. Field 610 identifies a version. The version field may comprise one octet field that identifies the MDP version information. The default value may be 0x1. Field 620 identifies a type. The type field may comprise one octet field that identifies the MDP message type. The default value may be 0x1 for advertising. Field 630 identifies a MAC address. The MAC address field may comprise a six octet field that identifies the MAC address of the WAN AP. Field 640 identifies an IP address. The IP address field may comprise a four octet field that identifies the IPV4 address of the WAN AP. Field 650 identifies the serial number. The serial number field may comprise a four octet field that identifies the serial number of the WAN AP.

In some examples, the MDP message format may comprise an Ethernet header followed by a MDP header. The Ethernet header fields may comprise a source MAC address (e.g., the WAN AP MAC address that originated the message), a destination MAC address (e.g., in a format of 0xFFFF-FFFF-FFFF), and an Ethertype (e.g., in a format of 0x8FE0). In some examples, the Ethertype is used to identify an MDP header that follows the Ethernet header.

In some examples, the MDP message follows the Ethernet header and MDP header. The MDP message fields may comprise a version (e.g., 0x1), type (e.g., MDP message type "advertise" in a 0x1 format), MAC address (e.g., the WAN AP MAC address), IP address (e.g., the WAN AP IP address), and serial number (e.g., the WAN AP serial number).

Figure 7:
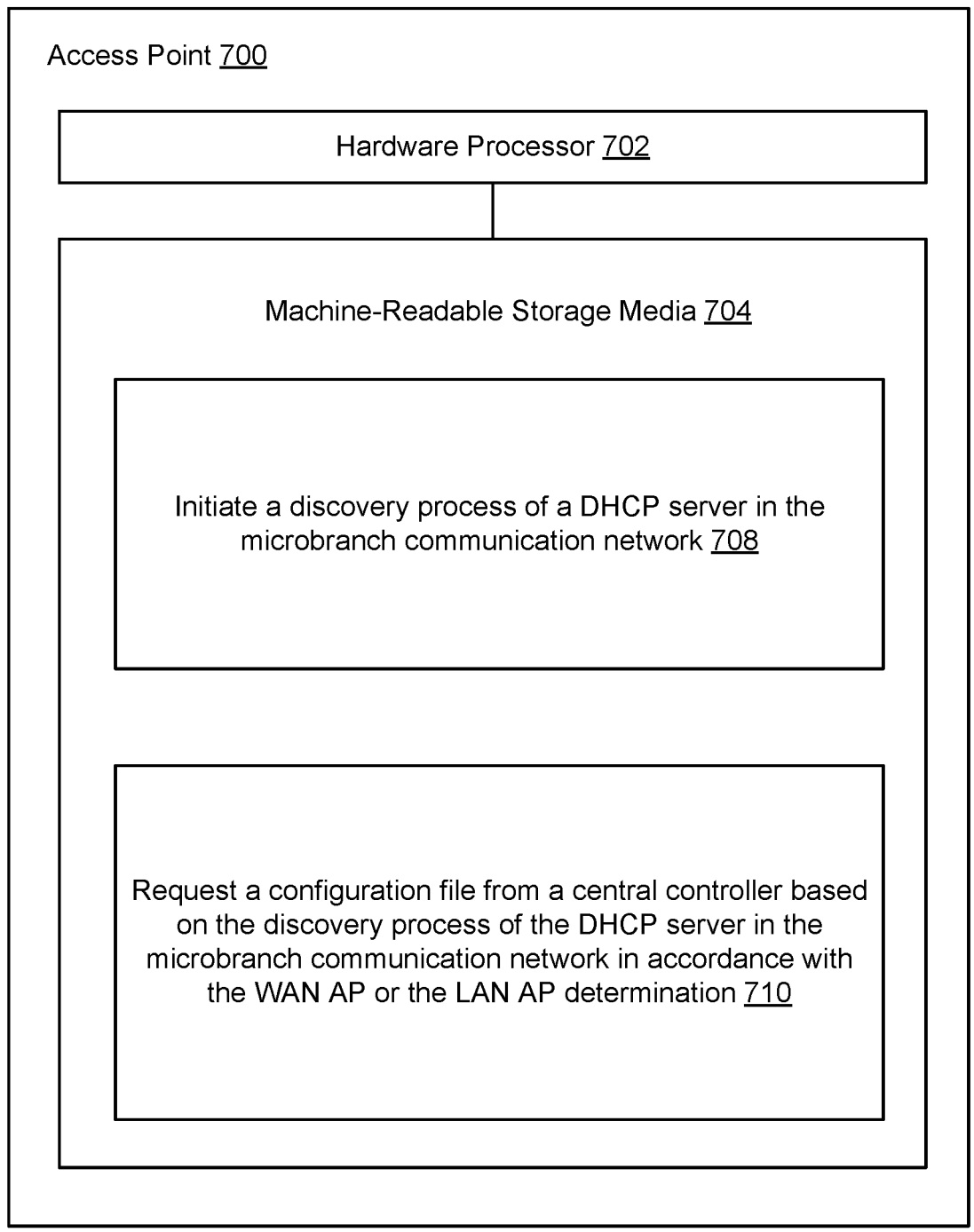
FIG. 7 is an example computing component that may be used to implement various features of some embodiments described in the present disclosure.

FIG. 7 is an example computing component that may be used to implement various features of some embodiments described in the present disclosure. In this illustration, computing platform 700 may be, for example, a server computer, a controller, or any other similar computing component capable of processing data. In the example implementation of FIG. 7, the computing platform 700 includes a hardware processor 702, and machine-readable storage medium 704.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions described throughout the disclosure. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, such as the instructions 708 and 710 described above.

Hardware processor 702 may execute instruction 708 to initiate a discovery process of a Dynamic Host Configuration Protocol (DHCP) server in a microbranch communication network. When a communication comprises a first Internet Protocol (IP) address of an Internet Service Provider (ISP), determine that the access point is a Wide Area Network (WAN) Access Point (AP) for the microbranch communication network, or determine that the access point is a Local Area Network (LAN) AP for the microbranch communication network using a second IP address of the WAN AP.

For example, discovery process may use DHCP Option 43 when the AP derives its IP address using the DHCP. For the WAN AP (e.g., the AP connected to the WAN Port), the ISP's CPE may be the DHCP server. For the LAN AP, the WAN AP may be the DHCP server (e.g., local to the AP), which allocates IP addresses to LAN APs in the branch. The local DHCP server running on the WAN AP may have the DHCP Option 43 configured/active. The DHCP Option 43 may contain information regarding WAN AP IP address, serial number, and media access control (MAC) address. The ISP DHCP server, which offers IP addresses to the WAN AP, may not include the vendor-specific DHCP Option 43. So, when the DHCP Option 43 is configured or active, the AP determines it is a LAN AP in the microbranch, and requests the LAN AP configuration settings in a configuration file from the central controller. Otherwise, when the DHCP Option 43 is not configured or active, the AP determines that it is a WAN AP in the microbranch, and requests the WAN AP configuration settings from the central controller.

In some examples, the discovery process may be automatically initiated when the AP boots up. For example, when a microbranch AP (e.g., in factory default state or non-factory default state) boots up, it starts a DHCP transaction through uplink port. For WAN AP, the uplink port is connected to WAN interface (i.e. typically ISP CPE device) and for LAN AP, the uplink port is connected to a switch or in some cases, it might be directly connected to the downlink port of WAN AP. So, the AP whose uplink port is connected to the ISP CPE receives its DHCP IP address from ISP DHCP server (which does not contain the vendor-specific DHCP option 43). By not receiving this vendor-specific DHCP option 43 in the DHCP offer, this AP would discover itself as WAN AP and connect to the central controller with its persona set to WAN AP. Similarly, the AP whose uplink port is connected to a port on switch will receive the IP address from the DHCP server running on the WAN AP (e.g., under the assumption in this example that that the WAN AP is functional and has the correct configuration from the central controller). The DHCP offer from the WAN AP can contain vendor-specific DHCP option 43. By receiving this DHCP option 43 in the DHCP offer from WAN AP, this AP can discover itself as LAN AP and connects to the central controller with persona set to LAN AP.

Hardware processor 702 may execute instruction 710 to request a configuration file from a central controller based on the discovery process of the DHCP server in the microbranch communication network in accordance with the WAN AP or the LAN AP determination. The configuration file may instruct the access point to operate in accordance with parameters defined in the configuration file, including for example, as a WAN AP or a LAN AP. For example, the configuration settings listed in a configuration file can identify a formation of an IPsec tunnel, or configuration file can identify the formation of an IPSec tunnel to a VPNC cluster or change the IPsec tunnel to a different VPNC cluster of the headquarter location.

Figure 8:
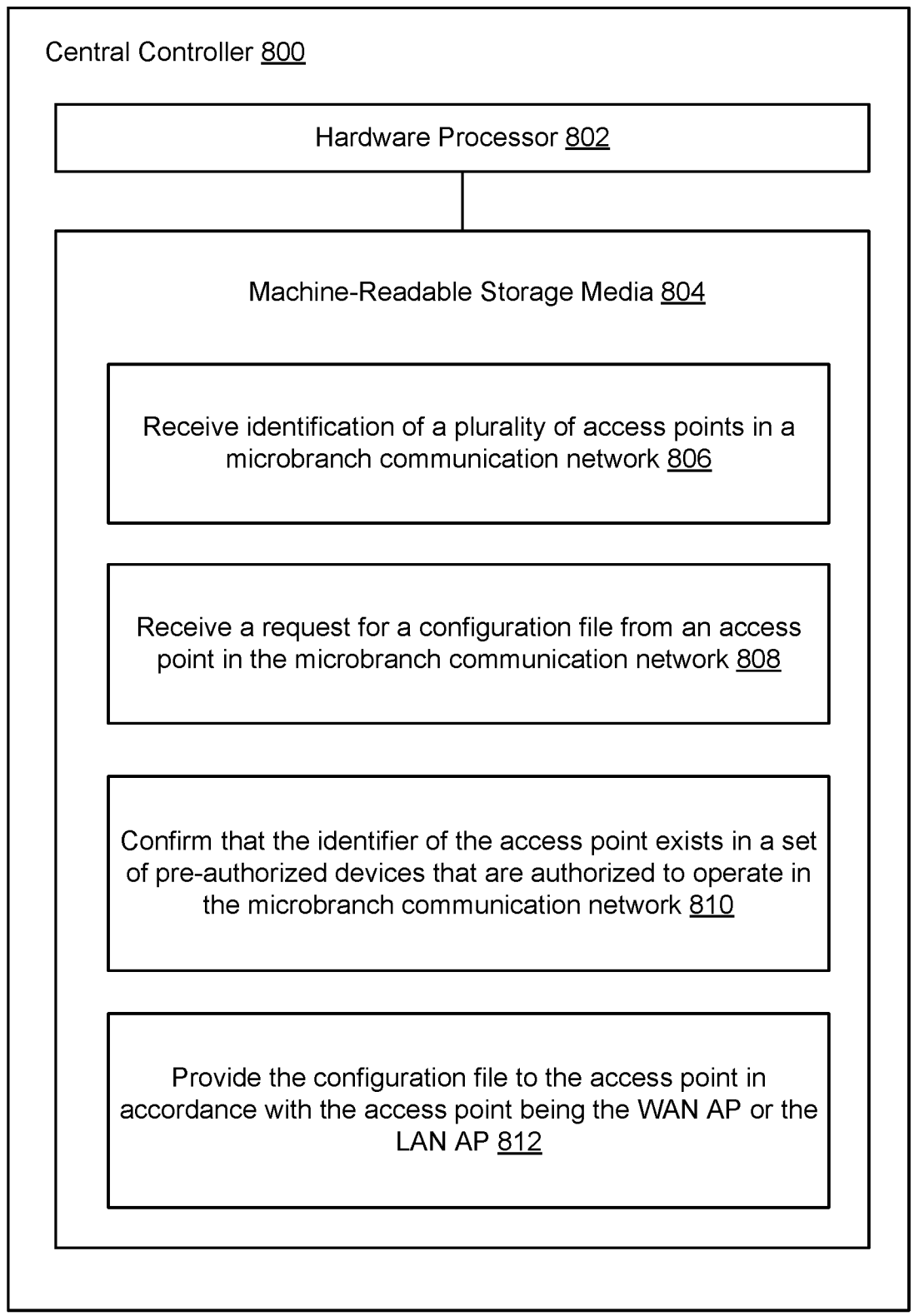
FIG. 8 is an example computing component that may be used to implement various features of some embodiments described in the present disclosure.

FIG. 8 is an example computing component that may be used to implement various features of some embodiments described in the present disclosure. In this illustration, computing platform 800 may be, for example, a server computer, a controller, or any other similar computing component capable of processing data. In the example implementation of FIG. 8, the computing platform 800 includes a hardware processor 802, and machine-readable storage medium 804.

Hardware processor 802 may be one or more central processing units (CPUs), semiconductor-based microprocessors, and/or other hardware devices suitable for retrieval and execution of instructions stored in machine-readable storage medium 804. Hardware processor 802 may fetch, decode, and execute instructions described throughout the disclosure. As an alternative or in addition to retrieving and executing instructions, hardware processor 802 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 804, may be any electronic, magnetic, optical, or other physical storage device that contains or stores executable instructions. Thus, machine-readable storage medium 804 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 804 may be a non-transitory storage medium, where the term "non-transitory" does not encompass transitory propagating signals. As described in detail below, machine-readable storage medium 804 may be encoded with executable instructions, such as the instructions 806-812 described above.

Hardware processor 802 may execute instruction 806 to receive an identification of a plurality of APs in a microbranch communication network. For example, the identification of a plurality of access points may identify which APs are authorized to operate in the branch (e.g., microbranch 110 in FIG. 1). The identification of the plurality of access points may be provided by an administrative user and stored with the central controller in memory as a list of pre-authorized devices that are authorized to operate in the branch or microbranch of the communication network. The central controller may access memory to determine the access points permitted to operate in the network.

Hardware processor 802 may execute instruction 808 to receive a request for a configuration file from an AP in the microbranch communication network. For example, the request may comprise an identifier of the access point and an indication that the access point is a WAN AP for the microbranch communication network or a LAN AP for the microbranch communication network that is determined through a discovery process of the DHCP server in the microbranch communication network.

Hardware processor 802 may execute instruction 810 to confirm that the identifier of the AP exists in a set of pre-authorized devices that are authorized to operate in the microbranch communication network. For example, the central controller may compare the identifier of the AP with the identifiers included in the list of pre-authorized devices that are authorized to operate in the branch or microbranch of the communication network.

Hardware processor 802 may execute instruction 812 to provide the configuration file to the AP in accordance with the AP being the WAN AP or the LAN AP. For example, when the identifiers match, the configuration file may be provided. The configuration file may be selected to provide to the access point in accordance with the access point being the WAN AP or the LAN AP. The configuration file may help the central controller instruct the access point to operate in accordance with parameters defined in the configuration file.

Figure 9:
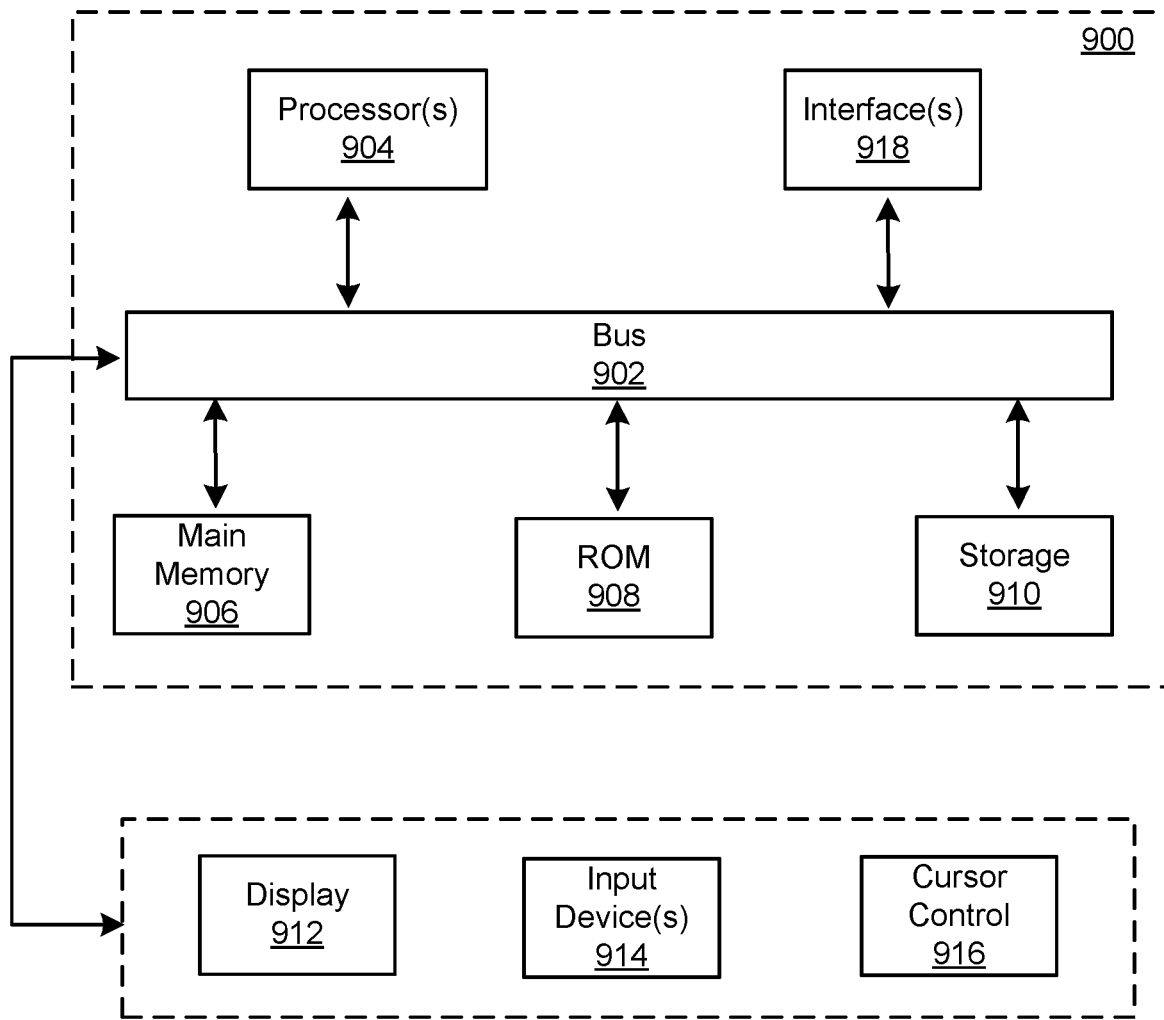
FIG. 9 is an example computing component that may be used to implement various features of some embodiments described in the present disclosure.

FIG. 9 depicts a block diagram of an example computer system 900 in which various of the embodiments described herein may be implemented. The computer system 900 includes a bus 902 or other communication mechanism for communicating information, one or more hardware processors 904 coupled with bus 902 for processing information. Hardware processor(s) 904 may be, for example, one or more general purpose microprocessors.

The computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

The computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

The computer system 900 may be coupled via bus 902 to a display 912, such as a liquid crystal display (LCD) (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. In some embodiments, the same direction information and command selections as cursor control may be implemented via receiving touches on a touch screen without a cursor.

The computing system 900 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 910. Volatile media includes dynamic memory, such as main memory 906. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 902. Transmission media can also take the form of acoustic or light waves, such as those generated during radio-wave and infra-red data communications.

The computer system 900 also includes an interface 918 coupled to bus 902. Interface 918 provides a two-way data communication coupling to one or more network links that are connected to one or more local networks. For example, interface 918 may be an integrated services digital network (ISDN) card, cable modem, satellite modem, or a modem to provide a data communication connection to a corresponding type of telephone line. As another example, interface 918 may be a local area network (LAN) card to provide a data communication connection to a compatible LAN (or WAN component to communicated with a WAN). Wireless links may also be implemented. In any such implementation, interface 918 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through interface 918, which carry the digital data to and from computer system 900, are example forms of transmission media.

The computer system 900 can send messages and receive data, including program code, through the network(s), network link and interface 918. In the Internet example, a server might transmit a requested code for an application program through the Internet, the ISP, the local network and interface 918.

The received code may be executed by processor 904 as it is received, and/or stored in storage device 910, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 900.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An access point comprising:
   a memory; and
   one or more processors that are configured to execute machine readable instructions stored in the memory to:
      initiate a discovery process of a Dynamic Host Configuration Protocol (DHCP) server in a microbranch communication network, wherein:
         when a communication comprises a first Internet Protocol (IP) address of an Internet Service Provider (ISP), determine that the access point is a Wide Area Network (WAN) Access Point (AP) for the microbranch communication network, or
         determine that the access point is a Local Area Network (LAN) AP for the microbranch communication network using a second IP address of the WAN AP; and
      request a configuration file from a central controller based on the discovery process of the DHCP server in the microbranch communication network in accordance with the WAN AP or the LAN AP determination, the configuration file instructing the access point to operate in accordance with parameters defined in the configuration file,
      wherein a configuration defined in the configuration file comprises the first IP address of the ISP, and the access point determines that the access point is the WAN AP associated with a Customer Premise Equipment (CPE) of the ISP operating as a DHCP server.

2. The access point of claim 1, wherein the second IP of the WAN AP that runs a local DHCP server on a management VLAN to generate the second IP and includes DHCP option 43 configured or activated to identify the access point as the LAN AP for the microbranch communication network.

3. The access point of claim 1, wherein the WAN AP initiates an unsolicited microbranch discovery protocol (MDP) at a predetermined interval of time, and wherein a message associated with the MDP comprises information present in DHCP option 43.

4. The access point of claim 3, wherein the message associated with the MDP comprises an Ethernet header and a MDP header.

5. The access point of claim 4, wherein the Ethernet header comprises a source MAC address, destination MAC address, and an Ethertype.

6. The access point of claim 4, wherein the MDP header comprises a type, MAC address of the WAN AP, IP address of the WAN AP, and a serial number of the WAN AP.

7. A method comprising:
   initiating, by an access point, a discovery process of a Dynamic Host Configuration Protocol (DHCP) server in a microbranch communication network, wherein:

when a communication comprises a first Internet Protocol (IP) address of an Internet Service Provider (ISP), determine that the access point is a Wide Area Network (WAN) Access Point (AP) for the microbranch communication network, or determine that the access point is a Local Area Network (LAN) AP for the microbranch communication network using a second IP address of the WAN AP; and requesting, by the access point, a configuration file from a central controller based on the discovery process of the DHCP server in the microbranch communication network in accordance with the WAN AP or the LAN AP determination, the configuration file instructing the access point to operate in accordance with parameters defined in the configuration file, wherein a configuration defined in the configuration file comprises the first IP address of the ISP, and the access point determines that the access point is the WAN AP associated with a Customer Premise Equipment (CPE) of the ISP operating as a DHCP server.

8. The method of claim 7, wherein the second IP of the WAN AP that runs a local DHCP server on a management VLAN to generate the second IP and includes DHCP option 43 configured or activated to identify the access point as the LAN AP for the microbranch communication network.

9. The method of claim 7, wherein the WAN AP initiates an unsolicited microbranch discovery protocol (MDP) at a predetermined interval of time, and wherein a message associated with the MDP comprises information present in DHCP option 43.

10. The method of claim 9, wherein the message associated with the MDP comprises an Ethernet header and a MDP header.

11. The method of claim 10, wherein the Ethernet header comprises a source MAC address, destination MAC address, and an Ethertype.

12. The method of claim 10, wherein the MDP header comprises a type, MAC address of the WAN AP, IP address of the WAN AP, and a serial number of the WAN AP.

13. The access point of claim 1, wherein the microbranch communication network comprises at least one WAN AP and at least one LAN AP.

14. The access point of claim 13, wherein the at least one WAN AP connects to the ISP and the at least one LAN AP connects to a southbound interface of the at least one WAN AP that implements a local DHCP server.

15. A non-transitory computer-readable storage medium storing a plurality of instructions executable by a processor, the plurality of instructions when executed by the processor causes the processor to:

initiate a discovery process of a Dynamic Host Configuration Protocol (DHCP) server in a microbranch communication network, wherein:

when a communication comprises a first Internet Protocol (IP) address of an Internet Service Provider (ISP), determine that an access point associated with the computer-readable storage medium is a Wide Area Network (WAN) Access Point (AP) for the microbranch communication network, or determine that the access point is a Local Area Network (LAN) AP for the microbranch communication network using a second IP address of the WAN AP; and request a configuration file from a central controller based on the discovery process of the DHCP server in the microbranch communication network in accordance with the WAN AP or the LAN AP determination, the configuration file instructing the access point to operate in accordance with parameters defined in the configuration file, wherein a configuration defined in the configuration file comprises the first IP address of the ISP, and the access point determines that the access point is the WAN AP associated with a Customer Premise Equipment (CPE) of the ISP operating as a DHCP server.

16. The non-transitory computer-readable storage medium of claim 15, wherein the second IP of the WAN AP that runs a local DHCP server on a management VLAN to generate the second IP and includes DHCP option 43 configured or activated to identify the access point as the LAN AP for the microbranch communication network.

17. The non-transitory computer-readable storage medium of claim 15, wherein the WAN AP initiates an unsolicited microbranch discovery protocol (MDP) at a predetermined interval of time, and wherein a message associated with the MDP comprises information present in DHCP option 43.

18. The non-transitory computer-readable storage medium of claim 17, wherein the message associated with the MDP comprises an Ethernet header and a MDP header.

19. The non-transitory computer-readable storage medium of claim 18, wherein the Ethernet header comprises a source MAC address, destination MAC address, and an Ethertype.

20. The non-transitory computer-readable storage medium of claim 18, wherein the MDP header comprises a type, MAC address of the WAN AP, IP address of the WAN AP, and a serial number of the WAN AP.

* * * * *